Patented June 13, 1939

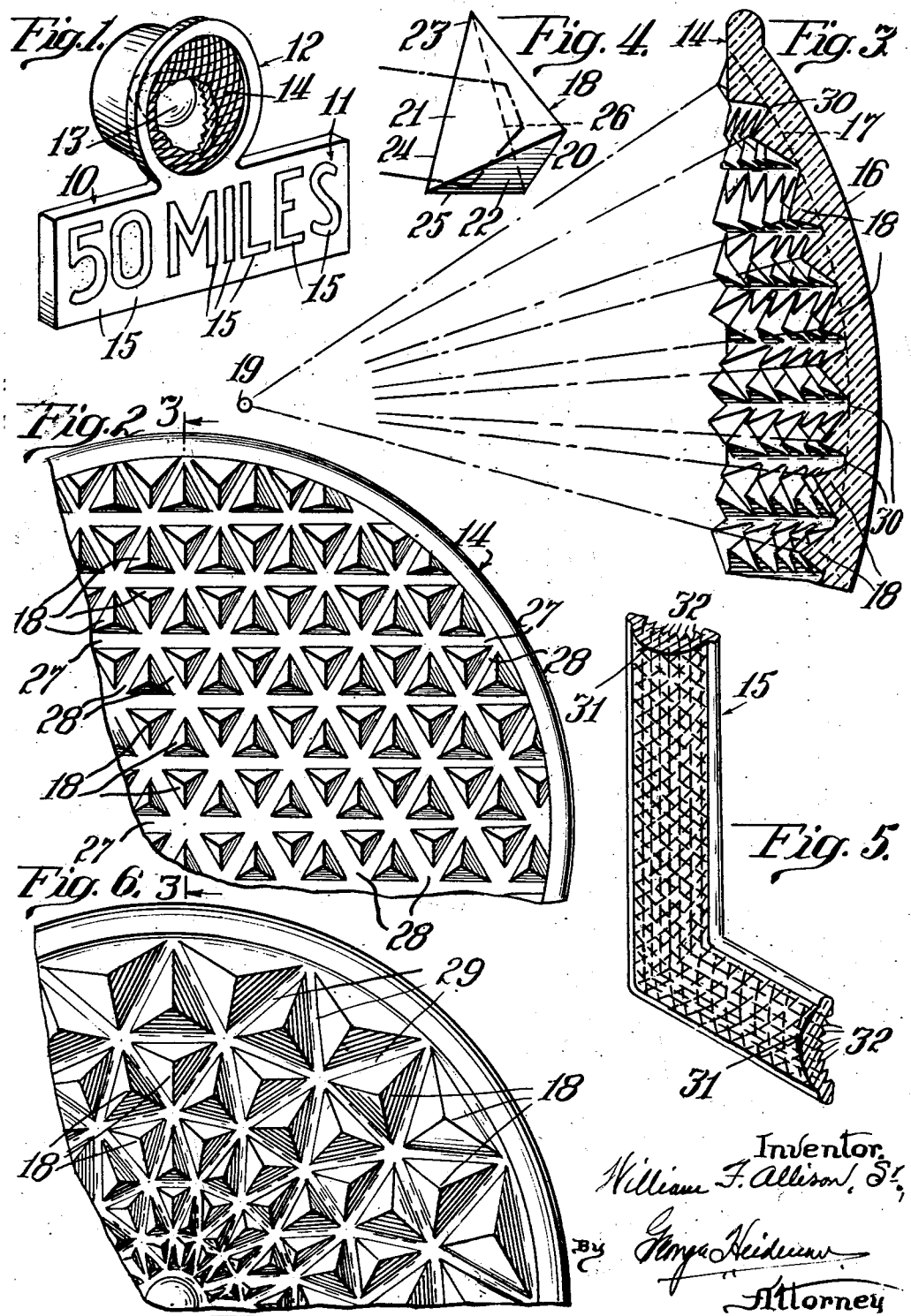
June 13, 1939. W. F. ALLISON, SR 2,161,842
COMBINATION LENS AND REFLECTOR
Filed Dec. 11, 1936

2,161,842

UNITED STATES PATENT OFFICE 2,161,842

COMBINATION LENS AND REFLECTOR

William F. Allison, Sr., Strong City, Kans.

Application December 11, 1936, Serial No. 115,366

3 Claims. (Cl. 88—82)

My invention relates to a combination lens and reflector of the character designed for signalling and aiding traffic; the invention having for its object the provision of a device adapted for use as a lens in connection with a source of light and possessing the desired refractive characteristics for the light rays at the rear of the lens, while also possessing the desired reflective qualities, in connection with the light rays of an oncoming vehicle; my improved device, whether in the form of a lens or in the form of a sign without the use of a lamp having great reflective qualities.

The invention also has for its object the provision of a device, either in the nature of a lens for a lantern or in the nature of a button, disc, numeral or letter so formed and provided with refracting and reflecting surfaces that any light rays which may impinge on the device, regardless of the angle, will be refracted and dispersed over substantially the entire area of the device so as to substantially eliminate so-called dead spots in order to render the luminosity visible throughout a greater angular range than has heretofore been the case.

Further objects of the invention are the provision of a lens of the character mentioned which is self-cleaning of the elements which tend to adhere thereto; to provide a reflecting lens which is easily manufactured in various shapes and sizes, whether merely in the nature of an annular disc or lantern lens or in the nature of numerals or letters; to provide the lens with reflecting studs or facets arranged with their axes converging in a common focal point so that regardless of the direction of a light ray impinging on the reflector, one or more surfaces of the lens or device are in position to reflect the light rays over the area of the lens or device, while providing an arrangement of reflecting surfaces which will produce the greatest amount of refraction and reflection.

This application is a continuation in part of my application Serial Number 8,907, filed March 1, 1935.

The embodiments of my invention possessing the characteristics hereinbefore enumerated and constituting the preferred forms of the invention are illustrated in the accompanying drawing, wherein—

Figure 1 is a perspective view of the upper or signal carrying part of a railway slow board equipped with my invention both in the nature of the lens of a lamp and in the nature of indicating figures and letters.

Figure 2 is a plan view of a portion of a lens as viewed from the inner side and embodying my invention.

Figure 3 is a transverse sectional view of a portion of the circular lens and taken substantially on the line 3—3 in Figure 2.

Figure 4 is a detail perspective view of one of the pyramids or studs of the lens shown in Figures 1, 2 and 3 and diagrammatically illustrating the reflection of a light ray.

Figure 5 is an enlarged perspective of one of the letters of the slow board shown in Figure 1, with portions broken away.

Figure 6 is a plan view of a portion of a circular lens as viewed from the inner side and illustrating a modification of my invention.

My improved lens is adapted to many purposes such as danger signals, highway markers, signs, and the like which are to be rendered visible through reflection of beams of light projected from passing vehicles, or other sources of light which may fall thereon.

I, therefore, do not wish to be limited to the particular adaptation illustrated in the present drawing, wherein I have associated my invention with a railway slow board indicated at 10 and which is located adjacent the railroad tracks to indicate the speed at which a train may be operated over a certain section of the track.

Ordinarily these slow boards include a sign 11 mounted on a post and also involve a suitable lamp as at 12 in Figure 1. The lamp 12 is equipped with a suitable light source such as a light bulb 13 and a colored warning lens 14 which serves as a signal to attract the engineer's attention to the sign 11. Light bulbs are subject to failure and when extinguished, neither the sign nor signal would ordinarily be visible after darkness.

My improved lens is devised to overcome this difficulty as it not only serves to pass the light rays from the bulb 13 but it also forms a reflector which becomes highly illuminated by the headlight beam of an approaching train and increases the brightness of the signal and produces a highly effective signal in the event of failure or extinguishment of the light source within the lamp.

My invention is also applicable to the characters 15 as employed in Figure 1, one of which is shown in perspective in Figure 5, with its rear concaved and provided with the equal sided pyramids or studs as hereinafter described, in order that the characters are caused to glow incidental to the light rays cast thereon, as hereinafter described.

My improved lens or reflector element 14

(whether in the form of a character, button or lamp-lens) is constructed of light transmissive material highly refractive to light rays passing therethrough so that the rays can be dispersed through the body portion of the lens. In order that the lens may be rendered visible through a greater lateral range and also be self-cleaning of dust, snow and other elements that may fall thereon, it is constructed in concavo-convex form, having a smooth outer convex face 16 and a concave inner face indicated by the dotted line 17 and covered with studs 18.

The respective faces are spherical zones generated from a common center indicated at 19 in Figure 3, the radii of which have a definite relation to the diameter of the lens which is the maximum at which the studs may be withdrawn from a plunger type mold in order to give the greatest practical degree of convexity.

The thickness of the refracting portion of the lens, that is, the depth between the dotted line 17 and the outer face 16, is also of a definite minimum thickness to provide for sufficient refractibility of the light rays reflected from the respective facets and so that the light is dispersed over substantially the entire area of the lens.

The studs 18 are in the form of trihedral pyramids, the respective side faces 20, 21 and 22 of which form equal triangular facets with substantially equal base edges 24, 25 and 26 coinciding with the inner face of the lens, indicated by the dotted line 17. The pyramids may be arranged in circumferential, longitudinal or transverse rows on the inner face of the lens or element with alternate studs in the respective rows arranged reversely so that the base edge 24 of one stud substantially coincides with the base edge 24 of an adjacent stud in the same row and the base edge 25 coincides with the base edge 25 of the stud in the adjacent row to form substantially continuous lines 27 and 28 criss-crossing the lens in the examplification shown in Figure 2, while providing the bending radiating lines 29 in the exemplification shown in Figure 6. These lines are, in effect, shallow grooves preferably having slightly rounded bottoms 30 which receive the direct rays of light issuing from the light bulb.

These light rays strike the round surfaces at susbtantially right angles and pass through the lens without reflection but are refracted by the thickness of the refracting portion of the lens, between the dotted line 17 and the outer face 16, as shown in Figure 3. The lines 27, 28 and 29 are preferably in the nature of shallow grooves, although the contour of the refractive portion intermediate of the bases of adjacent rows of pyramids may be altered.

Since the lens is sufficiently thick and with its inner face formed as described, the light rays are dispersed therein and appear to illuminate the entire surface of the lens to thereby render the signal clearly visible as long as the bulb 13 is functioning. However, should the light become extinguished, the lens still is effective whenever light beams fall upon the front face thereof as the light beams will pass through the refracting portion and be reflected by the facets or triangular sides of the respective studs arranged as shown and described, which, together with the faces of the intervening grooves and the thickness and concavity of the lens will cause substantially the entire lens to give the desired glow with a minimum loss of light.

For example, assume that the dot and dash line indicated in Figure 4 is a light ray passing through the body portion of the lens to fall on the facet side 22 of the pyramid, the ray, upon striking the facet will be reflected across the pyramid to the side 20 from where it is again reflected to the other facet 21 and then reflected back to the refracting portion of the lens.

Attention is directed to the fact that all of the trihedral pyramids are arranged so that the axes extend through the apices thereof to coincide with radii of the lens from the point 19.

Due to the convex nature of the lens, it does not matter at what angle the original light rays fall upon the lens as there are always a number of facets in position to interrupt and reflect the light rays to other facets and so on, causing the entire face of the lens to glow under the ray of light.

In constructing the lens, the apices of the pyramids as well as the side edges thereof should be as sharp as possible.

It is also important that the radius of curvature should be the maximum allowable, and the pyramids from perimeter to center of the lens or element should uniformly decrease in size in all directions with their apices all disposed toward a common focal point as indicated in Figure 3. If such was not the case, it would be difficult to withdraw the plunger portion of the mold without disrupting the alignment of the facets.

That is to say, in order to permit the moulding of the lens according to my invention and provide the desired reflective and refractive qualities as hereinbefore defined, it is necessary in forming a concavo-convex lens of the curvature shown in Figure 3 that the trihedral pyramids or studs gradually decrease in base size and in height from the perimeter or outer edge of the lens or element toward the center of the lens or element as shown in Figure 3 and at the sides of the character 15 shown in Figure 5.

The characters or letters have convex outer surfaces 31 shown extending longitudinally of the vertical body portions and concave inner surfaces which are provided with the studs 32 of trihedral shape and in substantially the same arrangement as in the leans.

In Figure 6 I illustrate a modification of my improved lens in that the pyramids 18, instead of being arranged in transverse rows as in Figure 2 are arranged in circumferential rows, thereby providing the radiating lines or vallies 29. It will be understood, of course, that the pyramids 18 are identical with those shown in Figures 2, 3 and 4 and that each alternate stud in each circumferential row is reversed so that the base edge 25 of each pyramid in one row will face a similar base edge of the adjacent pyramid in the adjacent row, while the pointed juncture 23 between the base edges of the sides 20 and 21 will be disposed toward the similar pointed juncture of the sides 20 and 21 of the adjacent pyramid in the adjacent row.

From the foregoing it is apparent that I have provided a lens (whether of circular or other form or in the nature of figures or letters) which serves the dual purpose of a reflector in such a manner that all parts thereof become illuminated and no dead spots appear, regardless of the angle at which the light rays fall thereon.

It will also be noted that my invention is adapted for the reflection of extraneous light rays and, therefore, is not limited to use merely as a lamp-lens and hence modifications of the exemplifications shown in the drawings may be made without, however, departing from the spirit of my invention as defined in the appended claims.

What I claim is:

1. A combined reflecting and refracting element comprising a concavo-convex body portion of light permeable material and whose convex and concave faces are of the same curvature, the convex side having a smooth surface; and a plurality of equal sided trihedral pyramids arranged on the concave side with their apex axes converging along lines coincident with the radii of the concave side of the curved body, the pyramids uniformly increasing in size from the center toward the edges of the concave surface and arranged in rows with the alternate pyramids in each row reversed so that two base edges of each pyramid are substantially coincident with the corresponding base edges of adjacent pyramids in the same row and the third base edge is substantially coincident with the corresponding base edge of the adjacent pyramid in the adjacent row to provide substantially continuous intersecting light transmitting surfaces.

2. A combined reflecting and refracting element comprising a concavo-convex body portion of light permeable material, the convex side having a smooth surface, and a plurality of equal sided trihedral pyramids arranged on the concave surface of the body with their apex axes converging along lines coincident with the radii of the concave side of the curved body, the pyramids gradually decreasing in size from the edges of the element toward the center thereof and arranged in rows with the alternate pyramids in each row reversed so that two base edges of each pyramid are substantially coincident with the corresponding base edges of adjacent pyramids in the same row and the third base edge is substantially coincident with the corresponding base edge of the adjacent pyramid in the adjacent row to provide substantially continuous intersecting light transmitting surfaces.

3. A combined reflecting and refracting element comprising a concavo-convex body portion of light permeable material and whose convex and concave faces are of the same curvature, the convex side having a smooth surface; and a plurality of equal sided trihedral pyramids arranged on the concave surface of the body with the apex axes converging along lines coincident with the radii of the concave side of the curved body, the pyramids gradually increasing in size from the center to the edges of the element and arranged in rows with the alternate pyramids in each row reversed so that two base edges of each pyramid are substantially coincident with the corresponding base edges of adjacent pyramids in the same row and the third base edge is substantially coincident with the corresponding base edge of the adjacent pyramid in the adjacent row to provide substantially continuous intersecting light transmitting surfaces, the portions of said surfaces between adjacent pyramids being of arcuate transverse cross section.

WILLIAM F. ALLISON, Sr.